R. E. BATES.
CONTROL DEVICE FOR MOTOR CYCLES AND THE LIKE.
APPLICATION FILED DEC. 30, 1916.

1,290,699.

Patented Jan. 7, 1919.
2 SHEETS—SHEET 1.

Inventor
Ralph E. Bates
By his Attorney
Charles H. Wilson

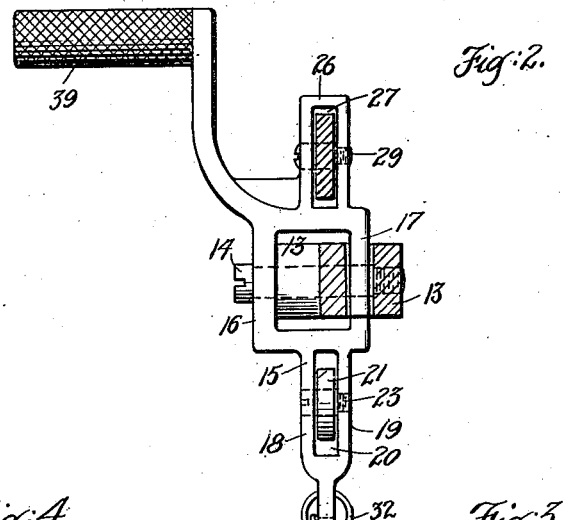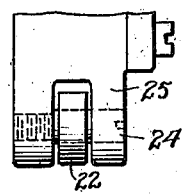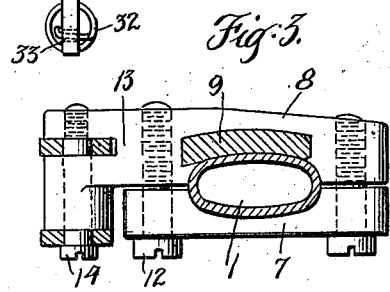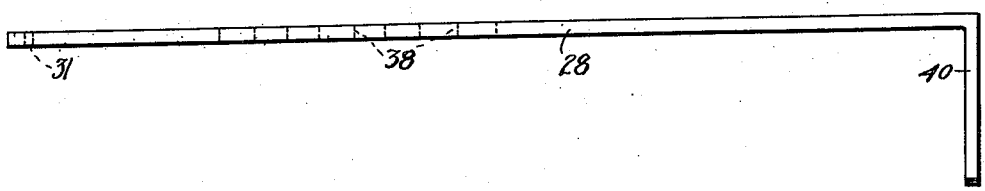

UNITED STATES PATENT OFFICE.

RALPH E. BATES, OF BROOKLYN, NEW YORK, ASSIGNOR TO OKAY MOTOR MANUFACTURING COMPANY, INC., OF BROOKLYN, NEW YORK, A CORPORATION OF NEW YORK.

CONTROL DEVICE FOR MOTOR-CYCLES AND THE LIKE.

1,290,699. Specification of Letters Patent. Patented Jan. 7, 1919.

Application filed December 30, 1916. Serial No. 139,946.

*To all whom it may concern:*

Be it known that I, RALPH E. BATES, residing at Brooklyn, in the county of Kings and State of New York, have invented certain new and useful Improvements in Control Devices for Motor-Cycles and the like, of which the following is a specification.

This invention relates to a control device for motorcycles and the like, and the particular object of the invention is to provide a simple means for controlling the drive mechanism in a motorcycle constrcted in accordance with the provisions of my co-pending application Serial Number 94,556.

Another object of my invention is to provide an improved means for mounting propelling mechanism on a bicycle of ordinary type, and for controlling the driving connection between the same and one of the wheels of said bicycle.

More particularly, my invention contemplates the provision of improved means whereby an engine having a driving connection with the front wheel of a bicycle of the ordinary type may be controlled and regulated.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown merely a preferred form of embodiment of the invention:

Fig. 2 is a fragmentary rear elevational view, looking in the direction of the arrow *a* in Fig. 1.

Fig. 3 is a sectional view taken substantially on the line III—III of Fig. 1, looking in the direction of the arrow.

Fig. 4 is a fragmentary view looking in the direction of the arrow *c* in Fig. 1.

Fig. 5 is a top plan view of a portion of the mechanism employed in controlling the device; and Fig. 6 is a similar view of another portion thereof.

Figure 1:
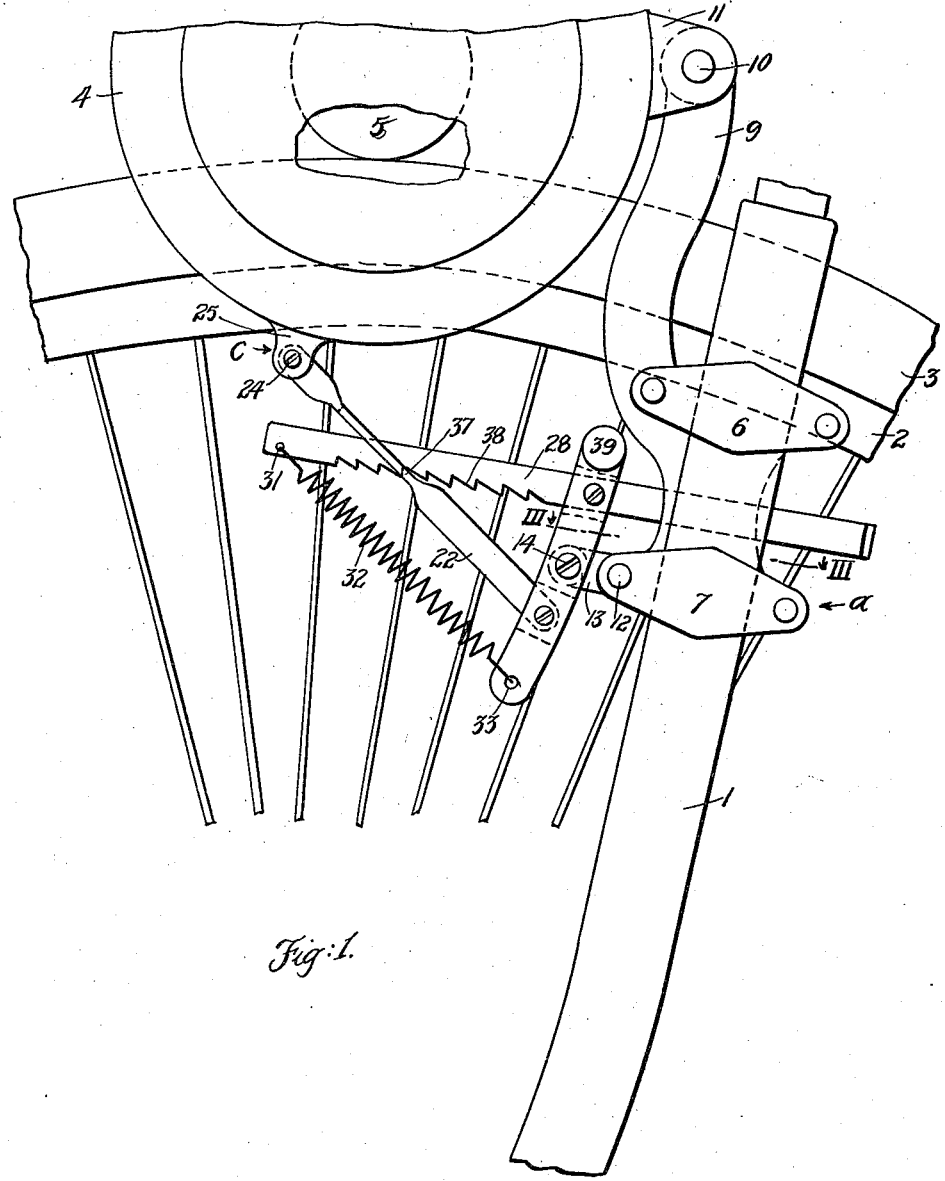
Figure 1 is a side elevational view of a portion of a bicycle showing mechanism constructed in accordance with the present invention.

Referring now to the drawings, wherein similar reference characters refer to similar parts throughout the several views thereof, the reference numeral 1 indicates a portion of the front fork of the bicycle, 2 indicates the front wheel of the bicycle, and 3 the tire. The reference numeral 4 indicates generally the motor of the bicycle which will be preferably of the ordinary two-cycled type, said motor having a driving wheel 5 which is connected with the driving shaft of the motor (not shown). This driving wheel when in operative relation with the bicycle rests upon the tire 3 of the wheel, and through its connection with said tire drives the wheel and thereby propels the bicycle.

The reference numerals 6 and 7 respectively, indicate clamping members which coöperate to clamp a bracket member 8 to one of the forks of the bicycle. The bracket 8 is provided with an arm 9 to the upper end of which is pivoted at 10 a lug 11 cast upon the frame of the motor 4. It will therefore be seen that by means of this construction the motor 4 is pivotally connected, as at 10, upon a member which is rigidly supported upon the fork of the bicycle. Extending from the bracket 8 is a forked arm 13, and to this arm is pivoted at 14, substantially midway of its length a lever 15. The shape of this lever is best show in Figs. 1 and 2 of the drawings, and it will be seen that said lever 15 is yoke-shaped, that is, it is provided with legs or sides 16 and 17 respectively, intermediate of its length, which straddle one member of the fork 13. The pivot pin 14 extends through the lever and the end of the fork 13. The lower end of the lever 15 is also yoke-shaped, that is, provided with the spaced legs or sides 18 and 19 respectively, providing a slot 20 into which is received the end 21 of a rod 22, the end 21 of said rod being pivotally connected to the lever 15 as by means of the pivot screw 23. This rod, which in the present instance is shown as being comprised by a strip of metal, has its opposite end pivotally connected, as at 24, with a lug 25 cast on the frame of the motor 4.

Inasmuch as the motor is shown pivoted at 10 to an arm fixed to the fork, it will be seen that a forward motion of the lower end of the lever 15 will, through the rod 22, lift the driving element 5 from the tire of the bicycle, thereby disconnecting the driving mechanism therefrom. The lever 15 is provided with the upstanding part 26 which is slotted, as at 27, in order to receive the lever 28 which extends through the slot 27 and is pivotally mounted, as at 29, to the upstanding part 26. The outer end of the lever 28 extends through a slot 30 which extends longitudinally of the rod 22 intermediate its ends and the extreme end of said lever 28 is at 31 connected with a retractile spring 32, the opposite end of which is connected at 33 with the lower end of the lever 15. Rod 22 and lever 28 it will be noted are constructed of strips of sheet metal and the rod 22 is twisted intermediate its length, as at 34 and 35 respectively, so that a flat portion 36 is provided so that the slot 30 thereof lies in a substantially vertical plane. The lower end of slot 30 is formed with a sharp point or catch 37 which is adapted to engage with a series of teeth 38 cut into the lever 28.

The upper end of lever 15 is provided with a foot-piece 39 located in a place convenient to the foot of the rider, and the inner end of the lever 28 is provided with a foot-piece 40, which is also convenient to the foot of the rider. Foot-pieces 39 and 40 are, however, so located as to prevent any interference one with the other when either is operated by the foot of the rider.

Having described the construction of this embodiment of my invention, the operation thereof can now be understood.

Assuming the parts to be in the position shown in Fig. 1 of the drawings, it will be seen that the spring 32 is operating upon the outer end of lever 28 to maintain one of the teeth 38 thereof in engagement with the catch 37. In this position it will be seen that the tooth of the lever 28 is engaged by the catch through the lever 28 and prevents the driving member 5 of the motor from being lifted from the wheel of the bicycle and it will further be seen that the pressure of the driving wheel 5 upon the tire is determined by the amount of stress which has been exerted upon the foot-piece 39, because outward pressure on this foot-piece 39 tends to project the lever 28 through the slot 30 of the rod 22 and the farther it is projected therethrough, the harder will be the pressure of the driving wheel 5 of the tire of the bicycle. It will also be seen that the spring 32 acting downwardly on the lever 28 will at all times maintain the catch in engagement with one of the teeth 38 of the lever 28 thereby holding the driving wheel 5 in engagement with the tire wheel 3.

When it is desired to remove the driving wheel 5 of the motor from the tire 3 of the wheel, it is only necessary for the operator to place his foot on the foot-piece 40 and push downwardly, whereupon the outer end of the lever 28 will be moved upwardly to disengage one of the teeth thereof from the catch 37. The spring 32 will then move the lever 38 endwise in a rearward direction, whereupon the lever 15 will be swung and the lower end moving forwardly will, through the rod 22, lift the driving wheel 5 from the tire of the wheel. This operation will, of course, disconnect the propelling mechanism from the bicycle.

When it is desired to again establish a driving connection between the motor and the bicycle, it is only necessary for the operator to again press forward on the foot-piece 39, whereupon the lever 28 will again be moved forwardly and the lower end of the lever rearwardly, causing the rod 22 to again connect the drive wheel 5 of the motor with the tire 3 of the bicycle wheel.

Thus it will be seen that I have provided mechanism well adapted to connect and disconnect the drive wheel of a gas engine with the tire wheel of a bicycle in an efficient manner, and which can be manipulated by the rider at a position entirely convenient to his foot.

It will also be seen that the spring 32 furnishes the energy for moving the drive connection between the motor and the bicycle, it being merely necessary for the operator to press downwardly on the foot-piece 40, whereupon the spring is permitted to perform its function.

As many changes could be made in this construction without departing from the scope of the following claims, it is intended that all matter contained in the above description or shown in the accompanying drawing shall be interpreted as illustrative only and not in a limiting sense.

Having thus described my invention what I claim as new and desire to secure by Letters Patent is:

1. In apparatus of the class described, the combination with a vehicle wheel, a frame, and a motor mounted upon the frame, having a drive wheel which is adapted to engage the tire of the vehicle wheel, of foot-propelled mechanism for engaging the drive wheel with the vehicle wheel, spring means for lifting the drive wheel from the tire of the vehicle wheel, and a catch for allowing the spring means to become operative.

2. In apparatus of the class described, the combination with a vehicle wheel and frame of a bicycle, of a motor pivotally mounted on said frame having a drive wheel adapted to engage with the tire of the vehicle wheel and thus propel the bicycle, foot operated mechanism adapted positively to engage the drive wheel with said tire, spring controlled means for maintaining said drive wheel in such engagement, said spring controlled means being also adapted to disengage the drive wheel from the vehicle tire, and foot-controlled means for permitting said spring controlled means to perform said last mentioned operation.

3. The combination with a vehicle wheel, a frame therefor, and a motor having a driving member adapted to engage with the tire of the vehicle wheel, of foot-controlled lever mechanism mounted upon the frame of the wheel adapted to engage said driving member with the tire of the vehicle wheel, spring controlled mechanism operating upon said lever mechanism for maintaining said driving member in such engagement, said spring controlled mechanism being also adapted to disconnect the driving member from said tire and foot-controlled means for rendering said spring controlled mechanism operative to perform said last named function.

4. In apparatus of the class described, the combination with the front wheel of a bicycle, the front fork of the bicycle, and a motor pivotally supported upon said front fork, of a driving member carried by the motor adapted to engage the tire of the vehicle wheel to drive the same, lever mechanism adapted when engaged by the foot of the rider to force said driving member into engagement with said vehicle tire, spring means adapted to hold said driving member in such engagement, said spring means being adapted to lift said driving member from engagement with the tire, and means adapted to be engaged by the foot of the operator for permitting said spring means to become operative.

5. In apparatus of the class described, the combination with a vehicle wheel, a frame therefor, and a motor having a driving member adapted to engage and drive said wheel, of means operated by the foot of the rider adapted positively to hold said driving member into engagement with the wheel with a pressure dependent upon the stress exerted by the foot of the rider, spring means for disconnecting said driving member from the tire of the vehicle wheel, and catch mechanism adapted to be operated by the foot of the rider for permitting said spring means to become operative.

6. In apparatus of the class described, the combination with a vehicle wheel, a frame therefor, and a motor pivotally carried by said frame, having a driving member adapted to engage with the tire of the vehicle wheel, of means which are positively operated by the foot of the rider to engage the driving member of the motor with the tire of the vehicle wheel and positively hold it in such engagement, and spring means which when operated will disengage the driving member from said tire, and catch mechanism for allowing said spring mechanism to come into play.

7. In apparatus of the class described, the combination with a vehicle wheel, a frame therefor, and a motor pivotally supported upon said frame having a driving member which is adapted to engage the tire of the wheel and have a driving connection therewith, of a lever pivotally mounted upon said frame having a connection with the motor adapted when moved in one direction by the foot of the operator positively to engage the driving member of the motor with the tire, and spring mechanism acting through said lever adapted to maintain said driving member in such engagement.

8. In apparatus of the class described, the combination with a vehicle wheel, a frame therefor, and a motor pivotally supported upon said frame having a driving member which is adapted to engage the tire of the wheel and having a driving connection therewith, of a lever pivotally mounted upon said frame having a connection with the motor adapted when moved in one direction by the foot of the operator positively to engage the driving member of the motor with the tire, spring mechanism acting through said lever adapted to maintain said driving member in such engagement, said spring mechanism being adapted to move said lever in another direction whereby the driving member of the motor will be lifted from engagement with the vehicle wheel, and means adapted to be operated by the foot of the operator for releasing said spring mechanism whereby it may perform its last mentioned function.

9. In apparatus of the class described, the combination with a vehicle wheel, a frame therefor, and a motor pivotally mounted upon the frame and having a driving member adapted to engage the vehicle wheel, of lever mechanism adapted positively to be operated by the foot of the rider for forcibly engaging the driving member with the tire of the vehicle wheel, automatically operative means coöperating with said lever mechanism for maintaining the driving member in such engagement, a portion of such last mentioned means being adapted to disconnect the driving member from said tire, and a foot control for said last mentioned means.

In testimony whereof I affix my signature in the presence of two witnesses.

RALPH E. BATES.

Witnesses:
MORRIS WEINBERG,
HELEN CAREY.